United States Patent
Jiang et al.

(10) Patent No.: US 9,662,712 B2
(45) Date of Patent: *May 30, 2017

(54) ADHERENT COATING ON CARBIDE AND CERAMIC SUBSTRATES

(71) Applicant: NanoMech, Inc., Springdale, AR (US)

(72) Inventors: Wenping Jiang, Fayetteville, AR (US); Mike Kimmel, Rogers, AR (US); Ajay P. Malshe, Srpingdale, AR (US); Brett McAfee, Fayetteville, AR (US)

(73) Assignee: NanoMech, Inc., Springdale, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/846,618

(22) Filed: Mar. 18, 2013

(65) Prior Publication Data
US 2013/0216806 A1   Aug. 22, 2013

Related U.S. Application Data

(63) Continuation-in-part of application No. 13/450,697, filed on Apr. 19, 2012, now Pat. No. 8,420,237.

(60) Provisional application No. 61/600,985, filed on Feb. 20, 2012.

(51) Int. Cl.
*B23B 27/14* (2006.01)
*B24D 99/00* (2010.01)
*C23C 16/34* (2006.01)
*C23C 16/36* (2006.01)
*C23C 16/30* (2006.01)

(52) U.S. Cl.
CPC ............ *B23B 27/148* (2013.01); *B24D 99/00* (2013.01); *Y10T 428/24975* (2015.01); *Y10T 428/24983* (2015.01); *Y10T 428/265* (2015.01)

(58) Field of Classification Search
CPC ....... B24D 99/00; B23B 27/14; B23B 27/148; B23B 2228/36; C23C 28/30; C23C 16/34; C23C 16/36; C23C 16/30
See application file for complete search history.

(56) References Cited

U.S. PATENT DOCUMENTS

| | | |
|---|---|---|
| 2,916,351 A | 12/1959 | Hansley |
| 4,619,865 A | 10/1986 | Keem et al. |
| 4,803,127 A | 2/1989 | Hakim |
| 4,984,940 A * | 1/1991 | Bryant et al. ................. 407/119 |
| 6,199,451 B1 | 3/2001 | Sollami |
| 7,572,881 B2 | 8/2009 | Pope et al. |

(Continued)

OTHER PUBLICATIONS

Sproul "Hafnium Nitride Coatings Prepared by Very High Rate Reactive Sputtering" Thin Solid Films, Aug. 1984, vol. 118, No. 3, pp. 279-284, ISSN 0040-6090, Abstract.

(Continued)

*Primary Examiner* — Pegah Parvini

(57) ABSTRACT

An adherent coating for carbide and ceramic substrates employs a thin layer between the substrate and a subsequent layer or layers. The thin layer may be employed without thermal cracking due to heat during use, such as for the insert of a cutting tool, because the upper layer or layers provide a gradual transition of material properties to a harder, less thermally conductive material on the outermost layer. A particular arrangement of layers on the carbide or ceramic substrate may be, from innermost to outermost layer, hafnium nitride, titanium carbide, aluminum oxide, and titanium nitride.

8 Claims, 3 Drawing Sheets

(56) References Cited

U.S. PATENT DOCUMENTS

| 8,420,237 B1* | 4/2013 | Jiang et al. ................. 428/698 |
| 2002/0102403 A1 | 8/2002 | Leverenz et al. |
| 2005/0175785 A1 | 8/2005 | Hentsch et al. |
| 2006/0263582 A1* | 11/2006 | Flink et al. ................. 428/216 |
| 2009/0226273 A1* | 9/2009 | Johansson et al. .......... 409/132 |
| 2010/0288817 A1 | 11/2010 | Yao |

OTHER PUBLICATIONS

Vancoille, E., et al. "Tribo-Oxidation of a TiN Coating Sliding Against Corundum," Journal of Materials Research 9.04 (1004): 992-998, KWIC citation by Google Scholar of Methods section.
International Search Report and Written Opinion with respect to International Patent App. No. PCT/US2013/26792.

* cited by examiner

ADHERENT COATING ON CARBIDE AND CERAMIC SUBSTRATES

CROSS-REFERENCE TO RELATED APPLICATIONS

This application claims priority from U.S. nonprovisional application No. 13/450,697, filed Apr. 19, 2012, and entitled "Adherent Coating on Carbide and Ceramic Substrates," which in turn claims priority from U.S. provisional patent application No. 61/600,985, filed Feb. 20, 2012, and entitled "Adherent Coating on Carbide and Ceramic Substrates."

STATEMENT REGARDING FEDERALLY SPONSORED RESEARCH OR DEVELOPMENT

Not applicable.

BACKGROUND OF THE INVENTION

Coatings are effective for improving the performance of various materials, such as for achieving better wear resistance and corrosion resistance. Common applications where a coating is applied to a substrate to improve wear resistance of the substrate material include cutting tool inserts for the cutting of hard materials, such as steel. Common substrate materials for cutting tools may include, for example, steel, other hard metals, and ceramics. The desired outer coating for the substrate may be of a material that does not bond well with the material of which the substrate is formed. Due to thermal expansion differences, typical coatings of materials such as titanium carbide, titanium carbonitride, titanium nitride, zirconia carbonitride and aluminum oxide do not adhere well to ceramic substrates, especially silicon nitrides and aluminum oxides.

Many coatings using these materials are produced at high temperature, which results in eta phases in the coating. Eta phases are a carbon-deficient form of a carbide material that result in a harder, much more brittle cemented carbide structure, which due to its brittle properties is prone to breakage. This breakage reduces the wear life of the cutting tool. An interfacial layer may be used to seal the substrate and prevent the formation of eta phase material. An adherent layer of a different material that is positioned as an interfacial layer between the substrate and the outer coating(s) may therefore be desired.

Hafnium nitride (HfN) has been explored as a coating material in the development of cutting tools. A desirable property of HfN in such applications is that it tends to "bend" rather than fracture under high-temperature conditions. It thus exhibits a good resistance to thermal cracking during cutting tool use. U.S. Pat. No. 4,406,667 to Sarin et al. teaches a composite substrate having a coating of a refractory metal nitride, including hafnium nitride as one example coating material.

Despite its resistance to thermal cracking, HfN is relatively soft when compared to other known cutting tool coating materials, and thus quickly wears away if used as the only coating on a cutting tool substrate. Cutting tool inserts using HfN as the only substrate coating layer or as the outer substrate coating layer are thus not widely used. U.S. Pat. No. 6,447,890 to Leverenz et al. teaches a hard metal substrate with two coatings, the first coating in contact with the substrate being of various potential materials, including a metal nitride of a group of metals including hafnium. The second coating may be a metal carbide, metal nitride, or metal oxide, including aluminum oxide ($Al_2O_3$). Thus Leverenz et al. '890 teaches HfN as a potential inner layer material with a harder material used as an overcoat or outer layer. Leverenz et al. '890 teaches, however, that the HfN first coating should be at least about 2 microns in thickness, preferably at least about 2 microns to 5 microns in thickness. Leverenz et al. '890 teaches that this innermost layer is provided to inhibit thermal cracking, and further that the specific thickness of at least 2 microns for the inner HfN layer is preferred so as to reduce the occurrence of cracks during the cutting process, which can lead to failure.

While HfN used as an interfacial layer does provide resistance to cracking for cutting tool inserts, the application of a thick HfN coating as taught by Leverenz et al. '890 significantly increases production costs for cutting tool inserts. Hafnium is itself a rare and expensive material, and the processes required to apply a coating in the thickness range specified by Leverenz et al. '890 require a substantial amount of coating time to achieve. Thus the time to produce each cutting tool insert is significantly increased, thereby lowering the overall manufacturing efficiency associated with the production of such cutting tool inserts, and significantly increasing their cost. For this reason, a cutting tool with improved resistance to thermal cracking, but that does not require the increased production time associated with a thick HfN interfacial layer, is highly desired.

References mentioned in this background section are not admitted to be prior art with respect to the present invention.

BRIEF SUMMARY OF THE INVENTION

The present invention is directed to a substrate with an inner coating comprising a thin layer of HfN material, the thickness of the HfN material being less than 2 microns, potentially with one or more additional layers of material over the HfN layer. The present invention has achieved the advantages of the HfN interfacial layer for resistance to cracking, but has done so using a thin HfN coating, which significantly lowers the manufacturing time and production cost associated with the resulting product.

In a first aspect, the invention is directed to a tool comprising a substrate and a first coating of certain materials wherein the first coating has a thickness in the range of a few nanometers to a few microns.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

Figure 1:
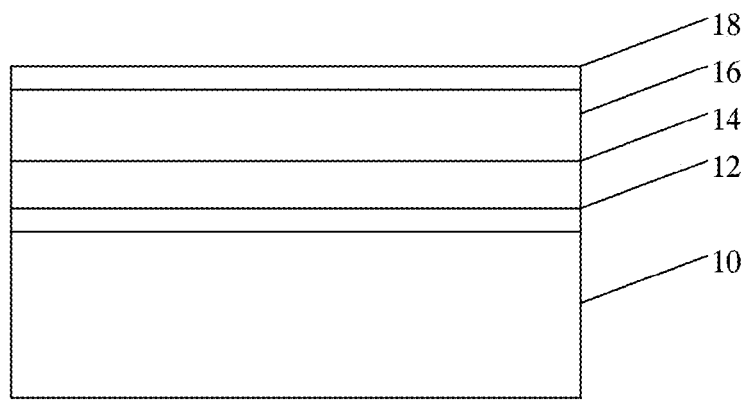
FIG. 1 is an illustration of a substrate with multiple coatings according to a preferred embodiment of the present invention.

With reference to FIG. 1, a preferred embodiment of the present invention for use in connection with a cutting tool insert may be described. A substrate 10 forms a base for the tool insert. Substrate 10 may preferably be formed of at least one of a carbide, a nitride, or a ceramic material. In the case of a carbide, the carbide may be various carbides of different particle sizes and different binder materials. In certain embodiments, the carbide substrate may be the combination of tungsten carbides of different particle sizes, preferably nano-sized to sub-micron sized particles, with cobalt or nickel as a constituent binding element in a percentage by weight ranging between 1.0% and 15.0%. The ceramic may be one or a combination of silicon nitride, silicon nitride with the addition of any toughening or reinforcing agents as are known in the art, aluminum oxide, aluminum oxide with titanium carbide, titanium carbide, titanium nitride, zirconium oxide, zirconium carbide, tungsten carbide, and aluminum nitride, or with other agents, as examples. The ceramic may include nanostructured binder phases. In the case of a nitride, the substrate may be a polycrystalline cubic boron nitride with a ceramic binder. Substrate 10 may further comprise a flash coating presented immediately over substrate 10, the flash coating comprising at least one of a carbide, a nitride, or an oxide.

In the preferred embodiment, layer 12 is a deposited layer of HfN on top of substrate 10, but could also include other materials such as titanium nitride (TiN), zirconium nitride (ZrN), or zirconium carbonitride (ZrCN) in alternative embodiments. Layer 12 could also, in alternative embodiments, comprise a composite material that includes, for example, these compounds in a combination or in combination with other compounds. The layer of HfN is of a thickness less than 2 microns, preferably less than 1.5 micron. A crack-free coating may be achieved, surprisingly by using high-temperature chemical vapor deposition (CVD) methods, rather than physical vapor deposition (PVD), plasma-enhanced CVD (PECVD), or plasma-assisted CVD (PACVD). In a particular example, the process utilizes a Bernex 250 furnace. Prior to deposition, the substrate is heated up to 1100° C. at a reactor pressure in the range of 300-900 mbar. The hafnium chloride is preferably produced by the reaction of electronic grade (99.995% purity) chlorine gas with a high-purity Hf sponge (reactor grade with size of −¾"+⅛") in an air-tight reactor, preheated to a temperature in the range of 400° C. to 450° C. This temperature range is desirable for activating the reaction of Hf with $Cl_2$ gas. The resulting hafnium chloride ($HfCl_4$), molecular nitrogen, and molecular hydrogen are then introduced into the flow for the purposes of providing the coating. Then chemical reactions for this process are as follows:

$$Hf(solid)+2Cl_2(gas) \rightarrow HfCl_4(gas)$$

$$2HfCl_4(gas)+N_2(gas)+4H_2(gas) \rightarrow 2HfN(solid)+8HCl$$

The temperature for this process may be in the range of 850° C. to 1200° C., preferably in the range of 1050° C. to 1100° C. The coating time, reactor pressure and furnace temperature used for producing the coating in the preferred embodiment is set forth below in Table I.

TABLE I

| Coating | Coating time, min | Reactor pressure, mbar | Furnace temperature, ° C. |
|---|---|---|---|
| HfN | 450 | 800 | 1080 |

The specific gas flow used for producing the coating is shown below in Table II.

TABLE II

| Coating | $H_2$ to reactor | $N_2$ to reactor | $Cl_2$ to Hf generator | $N_2$ to Hf generator |
|---|---|---|---|---|
| HfN | 30% | 47.2% | 1.4% | 22% |

It may be noted that the time for depositing the relatively thin HfN adherent layer according to this preferred embodiment is relatively short, which significantly reduces the overall time associated with the coating process, making the process more economically viable. This reduced coating time also reduces the potential damage to substrate 10 that may be caused by exposure of substrate 10—particularly in the case of a carbide substrate 10—to high temperatures for extended periods. Further, the reduced coating time lessens the likelihood of cracks appearing in the HfN layer during or after cooling.

Figures 2A, 2B:
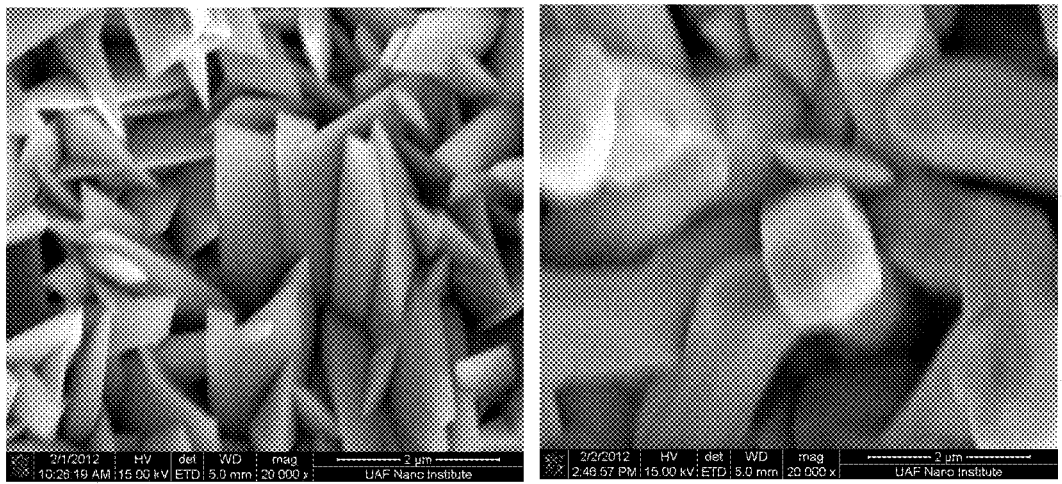
FIGS. 2A and 2B are SEM photographs in a top planar directional view of a HfN layer according to a preferred embodiment of the present invention.

After coating, cross-sectional analysis was used to show that the HfN coating layer that results from this procedure has a thickness of less than 2 microns, and more specifically in the range of about 1.0 microns to 1.5 microns. SEM analysis of the coating surface does not reveal any apparent cracks, as shown in the detail view photographs of FIGS. 2A and 2B, such that the surface would appear to be significantly devoid of cracks. Depending upon the surface morphology, the coating can be of a different granularity owing to the cooling conditions after the coating is completed. FIG. 2A shows the results of a coating where slow cooling was applied (i.e., a cooling time of about 4 to 6 hours), while FIG. 2B shows the results of a coating where quick cooling was applied (i.e., a cooling time of less than about 4 hours).

Figure 3:
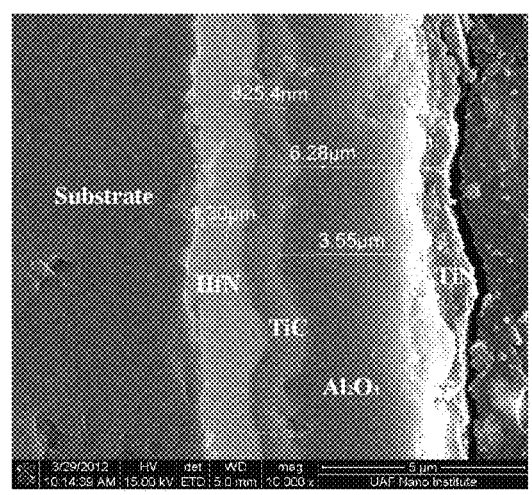
FIG. 3 is an SEM photograph of a substrate with multiple coatings according to a preferred embodiment of the present invention.

Other layers may be applied following the HfN layer in order to provide for a harder contact surface with the material to be cut by the cutting tool insert. Those materials may include, for example, titanium carbide (TiC), titanium nitride (TiN), titanium carbonitride (TiCN), zirconium carbonitride (ZrCN), and aluminum oxide ($Al_2O_3$), in various embodiments. Each of these layers may preferably be of thicknesses between a few hundred nanometers up to 40 microns, with a total coating thickness for all of the layers in the range of about 0.5 to 100 microns, and in the preferred embodiment a total thickness for all of the layers of about 8 to 10 microns. In a preferred embodiment of the invention, the layers provided are, from innermost to outermost with respect to the HfN layer 12, a layer 14 composed of TiC, a layer 16 composed of $Al_2O_3$, and a layer 18 composed of TiN. The thicknesses of each of these layers, again according to the preferred embodiment, is about 1.0 to 1.5 microns for HfN layer 12; about 1.5 to 3.5 microns for TiC layer 14; about 3 to 5 microns for $Al_2O_3$ layer 16; and about 1 to 2 microns for TiN layer 18. FIG. 3 is an SEM photograph showing layers according to an embodiment of the invention. The process parameters for deposition of these materials may be as shown in Table III for the preferred embodiment.

TABLE III

| Coating | $H_2$ | $N_2$ | HCl | $TiCl_4$ | $CH_3CN$ | $CH_4$ | CO | $CO_2$ | $H_2S$ | Temp, ° C. | Pressure, mbar | Duration, min |
|---|---|---|---|---|---|---|---|---|---|---|---|---|
| TiC | 87.4% | | | balanced | 3.4% | | | | | 1015 | 160 | 150 |
| $Al_2O_3$ | 87.46% | | 8.81% | | | | | 3.4% | balanced | 1015 | 60 | 210 |
| TiN | 63.16% | 26.32% | | balanced | | | | | | 1015 | 100 | 30 |

It may be noted that in commercial embodiments, the coating layers should preferably extend over the edges of substrate 10, but this aspect of the preferred embodiment is omitted from FIG. 1 for the sake of clarity. These layers 14, 16, and 18 may be deposited by conventional techniques. Other arrangements of material layers in alternative embodiments include, but are not limited to, HfN—TiN—TiCN—$Al_2O_3$ and HfN—$Al_2O_3$—TiC—TiN.

It may be seen that with the preferred combinatorial arrangement of coating materials, the materials used in each layer from the innermost to outermost provide a roughly gradual variation from softer to harder materials in terms of the hot hardness of the material at 1000° C.; specifically, the hot hardness for these materials is as follows: for HfN: 800-900 $kgf/mm^2$; for TiC: 200-300 $kgf/mm^2$; for Al2O3: 300-800 $kgf/mm^2$; and for TiN: about 200 $kgf/mm^2$. The materials also provide a rough gradual variation from materials of high thermal conductivity to materials of low thermal conductivity. It is believed that in this way, fracturing of the cutting tool insert is lessened because the gradual transition between properties of the materials on successive layers reduces stresses that otherwise would occur between these layers. Those stresses result in a shorter life for the cutting tool insert due to the layers shearing away from each other. This gradual transition of material properties also serves to reduce the stress particularly at the HfN layer, preventing cracks from forming as quickly as might otherwise occur due to high temperature conditions during cutting. It may be seen that the lower thermal conductivity of the upper layers serves to partially shield the lower layers to the HfN layer, which is important since HfN is a strong thermal conductor.

In alternative embodiments of the invention, the HfN layer 12 could be provided in a discontinuous rather than continuous form, or in both a continuous and a discontinuous form, either with the substrate and/or other layer coatings. Other coating layers may similarly be provided in discontinuous form or in both a continuous and discontinuous form while maintaining the gradual variation of thermal conductivity and hardness or other properties as for the preferred embodiment as described.

Turning now to a more specific description of alternative composite coating methods using spray deposition, the processes may include, but are not necessarily limited to, spray deposition of HfN particles as a coating preform followed by chemical vapor infiltration (CVI) techniques. In spray deposition, HfN particles size can be from a few nanometers to a few tens of microns. The particles can be in dry form or dispersion form.

In a typical embodiment for dry spray deposition, electrostatic spray coating (ESC), a given amount of HfN particles is fed to a spray gun with the assistance of carrier gases such as air and nitrogen at pressure ranging from 10 to 40 psi, preferably 30 psi. The particles are charged with a negative voltage ranging from 30 to 100 kV, preferably 65 kV, at the exit of the spray gun, and deposited on grounded substrates of 50~250 mm, preferably 150 mm, from the spray gun to form a base layer.

In another spray setup, the HfN particles are dispersed uniformly in dispersant with low vapor pressure. The dispersant can be alcohol, methane, and other agents. Typically, dispersion has 1~20% (weight concentration with preferred concentration of 2.0%) of HfN particles and the balanced dispersant. A desired amount of dispersion is metered and fed to the spray gun with the assistance of pressure air at 1~50 psi (8 psi preferred). The dispersed particles are charged in the transition process in a voltage of 20~850 kV, preferably 60 kV, within the spray gun, and deposited on substrates, 50~200 mm away from the spray gun, to form the base layer.

In a third alternative spray setup, ultrasonic spray deposition (USD), the HfN particles are dispersed uniformly in dispersant with low vapor pressure. The dispersant can be alcohol, methane, and other agents. Typically, dispersion has 1~20% (weight concentration with preferred concentration of 2.0%) of HfN particles and the balanced dispersant. A desired amount of dispersion is metered using a metering device such as syringe pump and fed to an atomization nozzle, working on high-frequency electrical signal induced mechanical vibration, with pressure air of 1~30 psi (5 psi preferred).

Chemical vapor infiltration (CVI) is then used to consolidate the said base layer using gases reaction. In infiltration, the temperature is in the range of 850~1100° C. with infiltration time between 60 minutes and 2400 minutes. The base layer may be bonded by microwave sintering, infrared (IR) heating, laser radiation, or any combination of the above.

In depositing HfN composite on cermet substrates, uniform mixture of powder feed stock with HfN particles and up to 30% of HfN and other metallic particles is fed to a high pressure cold spray system with helium gas as a processing gas. The sprayed particles impact the substrate surfaces and create sufficient plastic deformation on particles and substrate and bond together.

Figure 4:
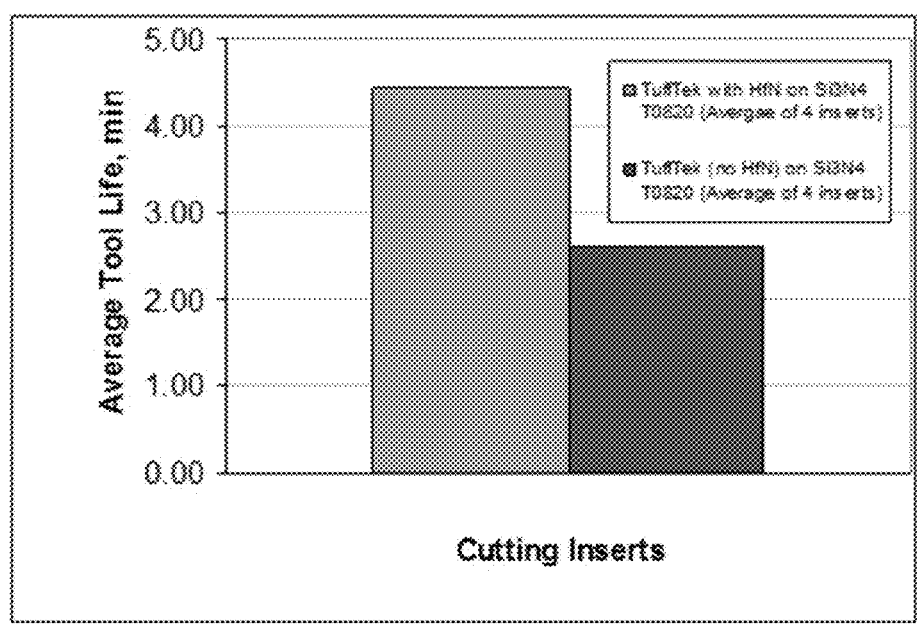
FIG. 4 is a bar chart comparing wear results with and without a HfN layer on a coated substrate.

In one particular application as an example of the spray deposition process building on the example cited above, $Si_3N_4$ inserts, CNMA432 T0820 were enhanced using a coating architecture consisting of HfN (900~1200 nm), TiC (1800~2400 nm), $Al_2O_3$ (3600~4200 nm), and TiN (2000~2500 nm) and tested in turning 80-55-06 ductile iron at material removal rate of 283168.5 $mm^3$/min with water based cutting fluid (pressure ~20 PSI), and were compared to identical $Si_3N_4$ inserts with the same said coating structure, but without HfN layer. As shown in FIG. 4, inserts enhanced using coating architecture with HfN as an interfacial layer outperformed identical inserts using similar coating architecture but with HfN layer significantly. The extended tool life is believed to be attributable to the high hot hardness, thermal crack resistance, and thermal expansion coefficient match to the substrates. Optical analysis of the tool failure indicated that coating with HfN layer adhered well after testing, while inserts without HfN layer showing significant delamination.

As used herein, "comprising" is synonymous with "including," "containing," or "characterized by," and is inclusive or open-ended and does not exclude additional, unrecited elements or method steps. As used herein, "consisting of" excludes any element, step, or ingredients not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

When a Markush group or other grouping is used herein, all individual members of the group and all combinations and subcombinations possible of the group are intended to be individually included in the disclosure.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Thus, additional embodiments are within the scope of the invention and within the following claims.

In general the terms and phrases used herein have their art-recognized meaning, which can be found by reference to standard texts, journal references and contexts known to those skilled in the art. The preceding definitions are provided to clarify their specific use in the context of the invention.

All patents and publications mentioned in the specification are indicative of the levels of skill of those skilled in the art to which the invention pertains. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention as set forth in the appended claims.

The invention claimed is:

1. A tool comprising:
    a. a substrate;
    b. a first coating in contact with the substrate, the first coating consisting essentially of hafnium nitride (HfN) and a second material selected from the group consisting of titanium nitride (TiN), zirconium nitride (ZrN), and zirconium carbonitride (ZrCN), wherein the first coating has a thickness of less than 1.5 µm and wherein the first coating comprises a surface devoid of cracks;
    c. a second coating over and in contact with the first coating, wherein the second coating consists essentially of a material selected from the group consisting of titanium carbide, titanium carbonitride, zirconium nitride, and zirconium carbonitride; and
    d. a third coating over and in contact with the second coating consisting essentially of aluminum oxide.

2. The tool of claim 1, wherein the substrate comprises at least one of a carbide, a nitride, a cermet, and a ceramic with nanostructured binder phases.

3. The tool of claim 1, wherein the substrate comprises a ceramic material selected from the group consisting of silicon nitride, aluminum oxide, titanium carbide, zirconium oxide, zirconium carbide, tungsten carbide, and aluminum nitride.

4. The tool of claim 3, wherein the substrate further comprises at least one of toughening and reinforcing agents.

5. The tool of claim 1, wherein the second coating comprises a thickness no greater than about 40 microns.

6. The tool of claim 1, wherein the second coating consists essentially of titanium carbide.

7. The tool of claim 1, further comprising a fourth coating over and in contact with the third coating, wherein the fourth coating consists essentially of a material selected from the group consisting of titanium carbide, titanium nitride, titanium carbonitride, and zirconium carbonitride.

8. The tool of claim 7, wherein the fourth coating consists essentially of titanium nitride.

* * * * *